United States Patent
Lee

(10) Patent No.: US 6,264,809 B1
(45) Date of Patent: Jul. 24, 2001

(54) ENHANCED MEMBRANE ELECTRODE DEVICES USEFUL FOR ELECTRODEPOSITION COATING

(75) Inventor: Cheng H. Lee, San Diego, CA (US)

(73) Assignee: PTI Advanced Filtration, Inc., Newbury Park, CA (US)

( * ) Notice: Subject to any disclaimer, the term of this patent is extended or adjusted under 35 U.S.C. 154(b) by 0 days.

(21) Appl. No.: 09/183,547

(22) Filed: Oct. 30, 1998

(51) Int. Cl.[7] .................................................. C25B 13/00
(52) U.S. Cl. .................. 204/282; 204/283; 204/252; 204/296; 204/415; 204/471; 204/482; 204/492; 205/133; 205/134; 205/148; 118/600; 118/602; 118/612; 118/408; 118/419
(58) Field of Search ................................. 204/282, 283, 204/471, 482, 492, 252, 296, 415; 205/133, 134, 148; 118/600, 602, 612, 408, 419

(56) References Cited

U.S. PATENT DOCUMENTS

| | | | |
|---|---|---|---|
| 4,529,646 | 7/1985 | Sundet | 428/315.5 |
| 4,629,563 | 12/1986 | Wrasidlo | 210/500.34 |
| 4,654,137 * | 3/1987 | Vaughan | 204/260 |
| 4,676,882 | 6/1987 | Okazaki | 204/260 |
| 4,711,709 * | 12/1987 | Inoue | 204/282 |
| 4,774,039 | 9/1988 | Wrasidlo | 264/41 |
| 4,814,082 | 3/1989 | Wrasidlo | 210/490 |
| 4,818,387 | 4/1989 | Ikeda et al. | 210/490 |
| 4,824,568 | 4/1989 | Allegrezza, Jr. et al. | 210/490 |
| 4,834,861 | 5/1989 | Inoue | 204/299 |
| 5,049,253 | 9/1991 | Izuo et al. | 204/301 |
| 5,071,458 | 12/1991 | Bikson et al. | 55/16 |
| 5,188,734 | 2/1993 | Zepf | 210/490 |
| 5,213,671 * | 5/1993 | Hess, Jr. et al. | 204/282 |
| 5,279,739 | 1/1994 | Pemawansa | 210/500.41 |
| 5,376,273 | 12/1994 | Pacheco et al. | 210/490 |
| 5,468,361 * | 11/1995 | Hess, Jr. et al. | 204/252 |
| 5,478,454 * | 12/1995 | Inoue | 204/482 |
| 5,480,554 | 1/1996 | Degen et al. | 210/651 |
| 5,507,929 | 4/1996 | Brochu et al. | 204/280 |
| 5,531,893 | 7/1996 | Hu et al. | 210/500.35 |
| 5,591,316 * | 1/1997 | Hess, Jr. et al. | 204/482 |
| 5,685,991 | 11/1997 | Degen et al. | 210/651 |
| B1 4,629,563 | 6/1997 | Wrasidlo | 210/500.34 |

FOREIGN PATENT DOCUMENTS 0415577   3/1991   (EP).

OTHER PUBLICATIONS

Anion–Exchange Membrances and Hollow Fibers Preparation, Characterization, and Applications, by Cheng H. Lee; pp. 178–185, no month/year available.

Advanced Membrane Technology, Inc.; Brochure; Published Nov., 1997.

* cited by examiner

Primary Examiner—Bruce F. Bell
(74) Attorney, Agent, or Firm—Pillsbury Madison & Sutro LLP

(57) ABSTRACT

One electrode is provided in association with the object to be coated, the other electrode. A pre-stretched ion-exchange membrane in a thin tubular form is sandwiched inbetween two nonconductive water permeable screen tubular housings. The assembly contains a supply line that provides a water way for the electrolyte to flow from the top of the device into a lower cap, then to the lower cap reservoir that allows stabilization and disbursement of electrolyte through the rifled housing Inertia developed through this defined pattern creates a swirling action that scrubs the impurities away from the anode, and to the top of the device to be carried out top. The location of the supply line is just inside the inner screen inserted through both the upper housing and lower cap. The tubular electrode is provided to the inside of membrane housing completing the inner portion of the waterway return chamber.

32 Claims, 4 Drawing Sheets

ENHANCED MEMBRANE ELECTRODE DEVICES USEFUL FOR ELECTRODEPOSITION COATING

BACKGROUND OF THE INVENTION

1. Area of the Art

The present invention relates to membrane electrode devices for electrodeposition coating. In particular the present invention relates to membrane electrode devices for electrodeposition coating (applying an "e-coat"), with an emphasis on the tubular membrane geometry of electrode devices for electrodeposition coating.

2. Description of the Art

Electrodeposition coating generally consists of two basic formats. These include anodic and cathodic systems for electrodeposition coating. Anodic systems refer to the object (+charge) that is being coated. In an embodiment of the system of the present invention, the coating material that is used is of the anodic type, although the present invention is equally applicable to use of the cathodic type.

The Anion type is one in which carboxyl elements cling to resin, aiding in water solubility. To increase the ionization factors of the water soluble coating, an alkaline neutralizing agent such as triethylamine is mixed into the coating solution. During the deposition of the resin molecules through ionization, the concentration of neutralizing agent increases. The coating material is successively replaced from an outside source.

As a by-product of the deposition, there is an accumulation of amine as a neutralizing agent. A phenomenon known as pin holes in the coating is produced if the excessive neutralizing agent is not moved to a specified level. The efficiency of the electrodeposition coating is impaired to a substantial extent by this drawback.

Cathodic systems refer to the object (−charge) that is being coated. In this system the coating material that is used is of Cathodic type. The Cathodic type is one in which amino elements attach to the resin molecules to aid in water solubility. To increase the ionization factors of the water soluble coating, an acidic neutralizing agent such as acetic acid is added. During the deposition of the resin molecules through ionization, the concentration of neutralizing agent increases.

The coating material should be successively replaced from an outside source. As a by-product of the deposition, there is an accumulation of Acetic acid. The phenomenon known as pin holes in the coating is produced if the excessive neutralizing agent is not removed to specified levels. The efficiency of the electrodeposition coating is impaired to a substantial extent by this drawback.

To eliminate and control this aforementioned issue, a pH control is performed for increasing the efficiency. This is accomplished using an electrode and aqueous solution separated and contained by use of an ion-exchange membrane or the like, distanced from the component that is being coated. The ion-exchange membrane allows the migration through osmosis of the amine and acetic acid, thereby preventing the neutralizing agent to concentrate in the aqueous solution. The acetic acid or amine is then mixed with a water solution that flows through the internal area and out the top of the ion-exchange portion of the electrodeposition device.

On the other hand, the use of dry ion-exchange membrane during the manufacturing of these electrodeposition devices causes the membrane to swell an average of 10% upon placement into the aforementioned aqueous solution. This effect combined with the pressure differentials that are present in the environment and mechanics of agitation of the aqueous coating material, forces the membrane to migrate around the devices tubular support structure, thereby reducing the efficiency of the device.

Furthermore, a reaction occurs such that impurities permeated through the ion-exchange membrane and impurities in the water found in the electrode and polarization occurs. Further oxygen molecules are displaced through electrolysis and can not easily be removed through conventional trickle down methods, or simple bottom feed systems. These forms of delivery present a disadvantage of that the efficiency of the electrodeposition is lowered with time.

Likewise, this form of inefficiency is observed in the electrodeposition coating in the form of increased operational cost. Furthermore, the operation of Electrodeposition devices create natural degradation of the sacrificial element referred to as the anode. This is the internal conductive part of the device. This component wears down at a rate dependent on, but not limited to current density, pH, chlorides, etc.

The ion-exchange membrane and housing have a higher life span than the electrode by as much as 3 times. The disadvantage of placing the internal flow mechanism within the anode relates to additional cost from routine replacement of the anode and all the additional components.

Attention is called to the following U.S. Letters Patents and Publications: No. 4,676,882 issued Jun. 30, 1987 to Okazaki; No. 5,049,253 issued Sep. 17, 1991 to Izuo; and Lee, C. H., ANION-EXCHANGE MEMBRANES AND HOLLOW FIBERS PREPARATIONS, CHARACTERIZATIONS, AND APPLICATIONS, 1993; Monsanto Corporate Research Dept.

In contradistinction to each of these known systems, the teachings of the present invention embrace and finally address the clear need for a better membrane based technology having an enhanced efficacy over conventional disclosures. It is respectfully submitted that each of the discussed references merely defines the state of the art, or highlights the problems addressed and ameliorated according to the teachings of the present invention. Accordingly, further discussions of these references has been omitted at this time due to the fact that each of the same is readily distinguishable from the instant teachings to one having a modicum of skill in the art.

OBJECTS AND SUMMARY OF THE INVENTION

Briefly stated, this invention relates to one electrode provided in association with the object to be coated, the other electrode. A pre-expanded ion-exchange membrane in a thin tubular form is sandwiched in-between two nonconductive water permeable screen tubular housings. The assembly contains a supply line that provides a water way for the electrolyte to flow from the top of the device into a lower cap, then to the lower cap reservoir that allows stabilization and disbursement of electrolyte through the rifled housing. Inertia developed through this defined pattern creates a swirling action that scrubs the impurities away from the anode, and to the top of the device to be carried out top. The location of the supply line is just inside the inner screen inserted through both the upper housing and lower cap. The tubular electrode is provided to the inside of membrane housing completing the inner portion of the waterway return chamber.

More specifically, in the above membrane electrode device, the membrane support member is formed on a nonconductive material, and there are many commonly used versions. All such conventional devices incorporate such a membrane being supported by a nonconductive member. One of which multiple through holes provide varying levels of height as to provide lower membrane contact. Unfortunately when the dry membrane swells, an outer wrap is provided to contain the swelling outward.

The excessive material is forced to occupy the inner portion of the membrane support member. This causes a reduction of accessible surface through hole area. The outer wrap also provides pockets to be formed in-between itself and the ion-exchange membrane. Paint solids accumulate in these pockets lowering the efficiency of the electrodeposition coating.

A porous member is formed by a sintering process. In this type the material is fairly thick and has a higher resistance value, demanding more energy to provide a coating. This format also has a tendency of allowing sediment from operating to close up the pores of the ion-exchange membrane with time, and the sintered tube has an elongated swelling characteristic that requires additional support providing a disadvantage is lower deposition of coating with time.

Furthermore, the mechanism in which the electrolyte solution is currently delivered and routed through the electrodeposition device should be examined. According to the instant teachings methods are used to deliver the solution to the bottom of the anode, then flow mechanisms respectively. The supply tubing runs continuously down and terminates in a boot at the bottom of the electrode. Once at the bottom cap, the fluid then exists uncontrolled or defined around the thin gap between the electrode and lower cap. Without definition and direction of the electrolyte solution, the ability to uniformly cleanse the electrode is lowered, reducing deposition effectiveness with time.

The present invention likewise contemplates a gravity feed system, which relies on the flow being governed by the differential in height between solution inlet and the outlet of the electrolyte solution. This mechanism has a very low flow rate providing inadequate circulation of the electrolyte solution, which results in lower deposition of coating with time, if conventional devices are used.

Commonly used mechanisms are available to be used between the membrane and anode. Once again the flow rate and the internal flushing pattern are poor. This poor circulation generate hot spots in the electrolyte solution, creating a higher conductivity, concentrating the current draw of the device in that location of the cell, eroding the electrode at an accelerated rate.

The present invention likewise teaches the mechanism for external supplying of the electrolyte solution. Besides the disadvantages described above the issues of the paint resins coagulating on the external parts will add "dirt" to the aqueous resin bath will produce a disadvantage of surface defects on the other electrode that is being coated. In all of the above membrane electrode devices the cleansing of the electrode is reviewed. During the deposition process an increase in acetic acid or amine through osmosis is common. If the elements are not directed away from the electrode the attachment of these elements will reduce the effectiveness of the electrode. Along with the acids or amines, the electrolysis process produces oxygen, which will accelerate the erosion if not removed from the surface, providing a lower life span and reducing coating of item being painted.

According to a further feature of the invention there is provided bottom end cap for a membrane electrode device wherein said end cap which comprises; a first cylinder with an inner surface and an outer surface, said surfaces defining a side wall; first and second ends, said first end being closed and said second end being open; a grooved means between said inner and outer surfaces for receiving a tubular membrane assembly at said second end; said inner surface defining an opening comprising at least a first and a second chamber, said first chamber being further defined by said first closed end, said second chamber having an inner diameter less than that of said first chamber, and of sufficient diameter to snugly receive an electrode; the inner surface defining said second chamber further comprising a plurality of grooves such that said first chamber is in fluid communication with said electrode along the length of said grooves.

According to a still further feature of the invention there is provided a bottom end cap for a membrane electrode device wherein said end cap which comprises; a first cylinder with an inner surface and an outer surface, said surfaces defining a side wall; first and second ends, said first end being closed and said second end being open; a grooved means between said inner and outer surfaces for receiving a tubular membrane assembly at said second end; said inner surface defining an opening comprising at least a first and a second chamber, said first chamber being further defined by said first closed end, said second chamber having an inner diameter less than that of said first chamber, and of sufficient diameter to snugly receive an electrode; the inner surface defining said second chamber further comprising a plurality of grooves such that said first chamber is in fluid communication with said electrode along the length of said grooves.

According to yet another still further feature of the invention there is provided a top end cap for a membrane electrode device, said top end cap comprising: an outlet means for a circulating wash fluid and a means for receiving a tubular membrane assembly such that an electrode can pass through the center of said top end cap, and through the center of said tubular membrane assembly.

The present invention has been developed to solve the above disadvantages of the prior art and is intended to be used as a membrane electrode device for electrodeposition coating. The design will provide satisfactory strength, blocking by sludge, increased effective membrane area, increased electrolyte circulation, and lowered paint build up on swollen membrane.

To achieve the object described above, the present invention may be comprised of a pre-expanded thin membrane tube sandwiched in the center between two nonconductive screens at a given distance and extended over the entire surface of the liquid flow portion of the device. An electrode is placed in the center of the device, creating the return portion of the waterway chamber for the electrolyte solution. Where as the solution is supplied to the device via supply tube that is routed from the top of the device to the bottom of the device between the inner screen and electrode. From the supply tube the solution is then stabilized and ported through the rifled housing that exists around the bottom of the electrode to the inner side of the membrane and creates a swirling action to the top of the device and flows to the outside. The design can work with the electrolyte, being delivered through the center of the electrode increasing the efficiency.

The above, and other objects, features and advantages of the present invention will become apparent from the following description read in conjunction with the accompanying drawings in which like reference numerals designate the same elements.

DETAILED DESCRIPTION OF THE INVENTION

The present inventor has discovered a way to reduce both operating and electrode replacement costs, by the development of an anolyte injection system. During the anodic version of the e-coat process, negatively charged acid anions are left behind as paint solids attach to the work piece. These anions, through electrolysis, are attracted to the anode in the anolyte cell, migrating from the paint bath through the membrane and into the ANOCEL™ type device, mixing with the dilute anolyte fluid in the cell. The anions are continuously removed via an anolyte recirculation system.

Maintaining the proper conductivity levels eliminates hot spots and uneven anode wear. Another by-product of electrolysis is oxygen. Unless removed, it will collect on, pit and erode the stainless steel anodes, thereby shortening their effective life. According to the present invention, the anolyte systems distribute the anolyte solution evenly across the anodes in an ANOCEL™ type device of box and semi-circular cells. Likewise, a 'rifled' delivery system in ANOCEL™ type of tubular cells increases the oxygen removal by a factor of three.

According to the present invention, a pre-expanded membrane is taught. The historical drawbacks of dry flat sheet electrolysis, whereby an electrolysis membrane was rolled between an inner and an outer support material to form a cell membrane tube has been overcome and improved upon. Instead of trying to control the inevitable distortion that occurred when membrane cells were wetted out in paint tanks, the present invention wets out and stretches (pre-expands) the electrolysis membrane flat sheet prior to rolling the membrane tube and sealing it on itself. Wetting may involve soaking the membrane in a solution of 30–50% by weight glycerin, ethylene glycol or an aqueous solution of polyhydroxy compounds. The wetting process may involve soaking the membrane in the solution for at least about 10 minutes. This unique process eliminates cell distortion in the paint tank and eliminates the need for wraps or mechanical stops. Being distortion free, the distance between the anode and membrane surfaces is maintained at the design dimension for the most efficient and economical operation.

Figure 3:
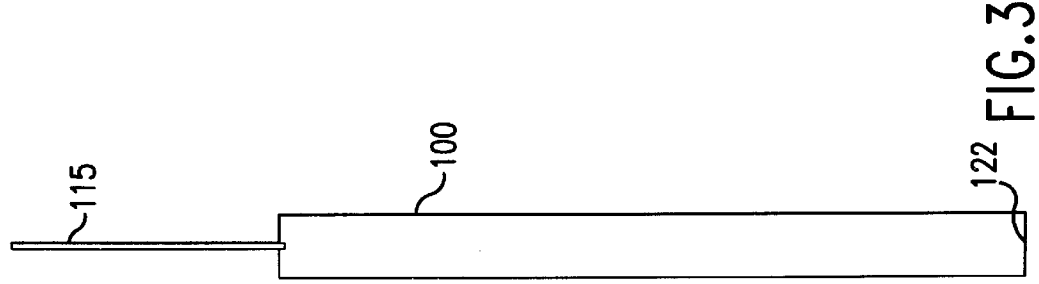
FIG. 3 is a schematized view of an anode as used with an embodiment of the anocel™ type of membrane electrode device for electrodeposition coating according to the present invention.
Figure 1:
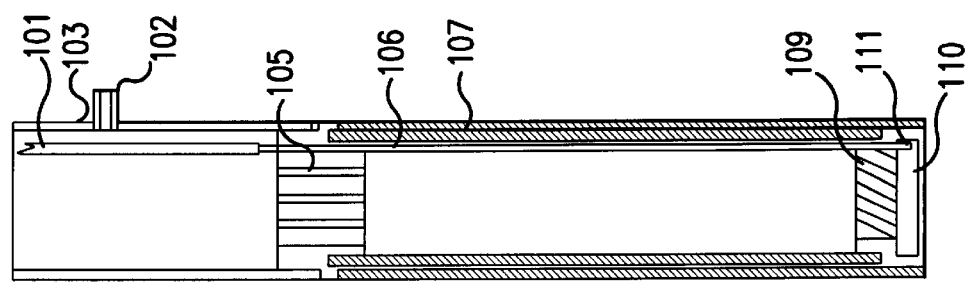
FIG. 1 is a schematized view of an embodiment an anocel™ type of membrane electrode device for electrodeposition coating according to the present invention prior to attachment of the pre-stretched membrane.

Referring now to FIG. 1, which shows a flush exterior model of the present invention, those skilled in the art will readily understand that the design will produce a much higher rate of flow around the electrode 100 (anode) as shown in FIG. 3.

Anolyte supply tube 101, with anolyte return nipple 102, is shown disposed upon PVC neck assembly 103, crossing grooved top cap 105 which is above pre-expanded membrane and housing assembly 107, through which passes anolyte supply line 106. Likewise angled rifled bottom cap 109 and anolyte supply exit 111, and anolyte lower cap manifold 110 are shown.

Figure 2:
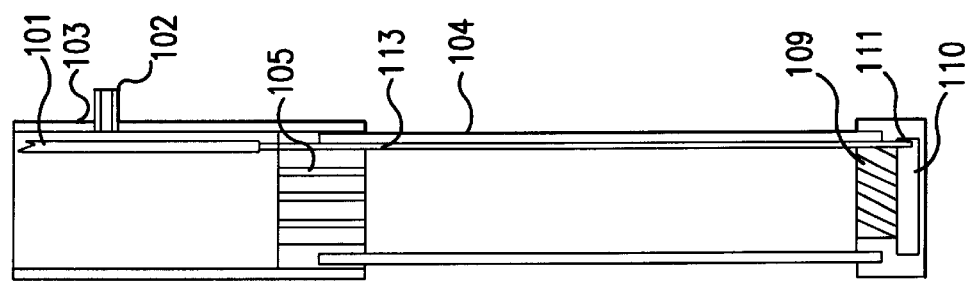
FIG. 2 is a schematized view of an embodiment of embodiment an anocel™ type of membrane electrode device for electrodeposition coating according to the present invention following attachment of the pre-stretched membrane.

Referring now also to FIG. 2, it is noted that the figures are the same except for the attachment of the Pre-expanded membrane 104. Since membrane 104 is stretched and then sealed into a tubular form, wrapping the membrane around an inner tubular support is not needed. Internal anolyte supply exit 111 is likewise depicted in this view.

Angled rifled bottom cap 109 provides vortex anolyte distribution that effectively increases dirt and oxygen removal by a minimum factor of about 3 times over known systems. For this reason, anolyte, other electrolytes or other fluids used to remove dirt and/or oxygen may be referred to as wash fluids. Likewise, according to this embodiment of the present invention a most electrically efficient 1.4 to 1 membrane to anode area ratio provides an improved throw power over known designs. A current density of 5 amps per square feet or less provides for an enhanced durational life. The simple one piece design requires no rebuilding and provides a strong tube with low resistance. The light weight nature and ease of handling of the present invention provides for simple removal of anodes for inspection. A standard open top and closed top design is contemplated by the instant teachings, which preferably utilize 316 L stainless steel, seamless, anodes, and may feature bare cells or those having membranes for anodic and cathodic systems.

Referring now also to FIG. 3, electrode extender 115 forms the required electrical connection at its terminus, while the electrode flow groove 122 is shown at the base of the electrode. Standard equipment, such as that produced by PTI Advanced Filtration, Inc. (Oxnard, Calif. and Gainesville, Ga.) includes, for example, one anolyte solution flow meter, three feet of anolyte return tubing, three feet of anolyte feed tubing and a cable lead with quick disconnect, in addition to two unistrut mounting clamps.

Figure 4A:
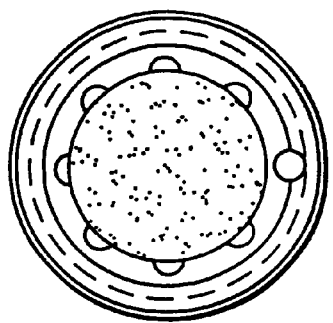
FIGS. 4A and 4B are a cross-sectional and transparent lateral view showing the lower rifled cap of an embodiment of an anocel™ type of membrane electrode device for electrodeposition coating according to the present invention.
Figure 5A:
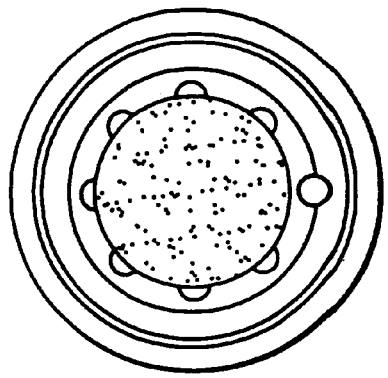
FIGS. 5A and 5B are a cross-sectional and transparent lateral view showing the upper rifled collar of an embodiment of an anocel™ type of membrane electrode device for electrodeposition coating according to the present invention.
Figure 4B:
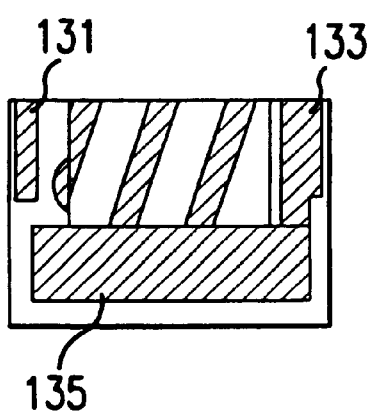
Figure 5B:
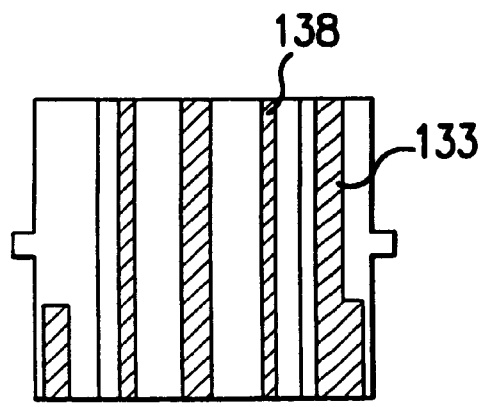

Referring now also to FIGS. 4A and 4B and to FIGS. 5A and 5B, it will become clear to those skilled in the art how the amount of riffles in the design requires 3–7 flutes for a defined flow pattern. The pattern that is produced causes fluid inertia and scrubs the walls of the electrode to carry away Oxygen and impurities that lower the performance of the cell. This is done by membrane housing well 131, anolyte supply passage 133, and anolyte lower manifold 135. Likewise, rifled return passage 138 is important in this process.

According to the teachings of the present invention, upon reaching the top of the cell the fluid is directed through the top rifling and then out the return nipple. As a comparison of the mechanics that are presently available the only known disclosures provide an outlet at the bottom of the anode that allows the fluid to go around a very small space that provides no definition of convection, or a tube that feeds the bottom of the cell from in between the inner support and the electrode. This resembles a straw that is not attached at the lower cap. The fluid leaves this tube and flows aimlessly in the cell.

Figures 6, 6A:
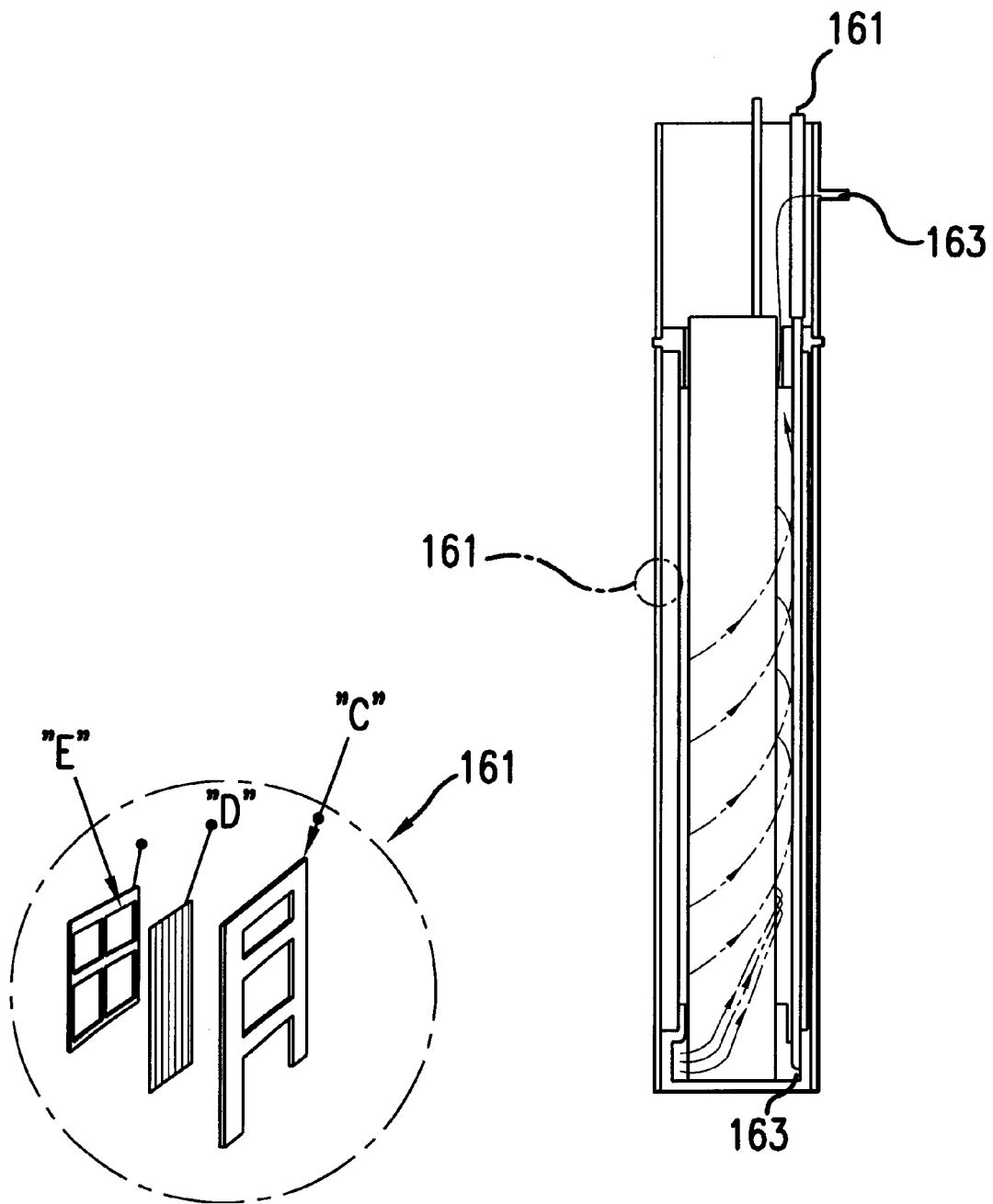
FIG. 6 is a schematic of an entire assembly in an embodiment of an anocel™ type of membrane electrode device for electrodeposition coating according to the present invention; and, FIG. 6A shows a partially exploded view of a cross-sectional view of a thin, windowed, nonconductive tubular frame that may be used in an embodiment of the assembly as shown in FIG. 6.

Referring now to FIG. 6, anolyte supply flows in through inlet 161. The detailed section labeled as 161 which is enlarged in FIG. 6A shows components that are used in the assembly. Namely, section "C" represents a thin, windowed, nonconductive tubular frame 162. The purpose of the frame is to prevent the membrane from contacting the anode, due to fluctuating pressures in the environment of the cells operation. This frame member will not support the weight alone of this device and requires an external, windowed frame of greater strength presented in section "E". Section 161 when assembled provides a space in-between section 161 components "A"-"C" and "A"-"E", for the membrane "D" to become placed. This assembly is potted into the lower cap and upper collar retaining separation between the inner and outer frame. The hole spacing of the frames are in the ratio of 2 to 1, 2 inner frame window areas openings=1 outer frame window areas.

Placing the membrane between these frames and not wrapping the membrane around the inner frame, allows less resistance and blockage of the electrical paths. The benefit of this is a highly productive and very efficient cell. Other cells are available on the market that use the inner frame as a mechanism to provide the tubular form from the dry type membrane. After the membrane is wrapped around the tube another layer of material is wrapped around the dry membrane to keep it from swelling when it becomes wet. The assembly provides a strong tubular form, but increases resistively of the cell lowering its performance. This style of cell also forces the expanded membrane to then become compressed into the holes provided by the inner frame. When this happens the efficiency is lowered due the increased resistance of the perpendicular path that is then created.

The electrolyte solution also known as anolyte has a unique delivery system in which the fluid is delivered to the bottom of the cell. This can be accomplished in many ways, inside the electrode (anode), between the electrode and inner frame, outside the outer frame, or between the inner and outer frame. In any case the displacement of this solution is important for the performance of the cell. To provide a stable and consistent flow pattern the rifled lower cap has a manifold cavity. Once the fluid is presented into the manifold it tracks around the anode, flowing through the rifled areas of the cap before exiting at 163. Likewise, the anolyte reservoir 165 is shown in this view.

The amount of rifling in the design requires 3–7 flutes for a defined flow pattern. The pattern that is produced causes fluid inertia and scrubs the walls of the electrode to carry away Oxygen and impurities that lower the performance of the cell. Upon reaching the top of the cell the fluid is directed through the top rifling and then out the return nipple. As a comparison of the mechanics that are presently available the only known disclosures provide an outlet at the bottom of the anode that allows the fluid to go around a very small space that provides no definition of convection, or a tube that feeds the bottom of the cell from in between the inner support and the electrode. This resembles a straw that is not attached at the lower cap. The fluid leaves this tube and flows aimlessly in the cell.

Figure 7:
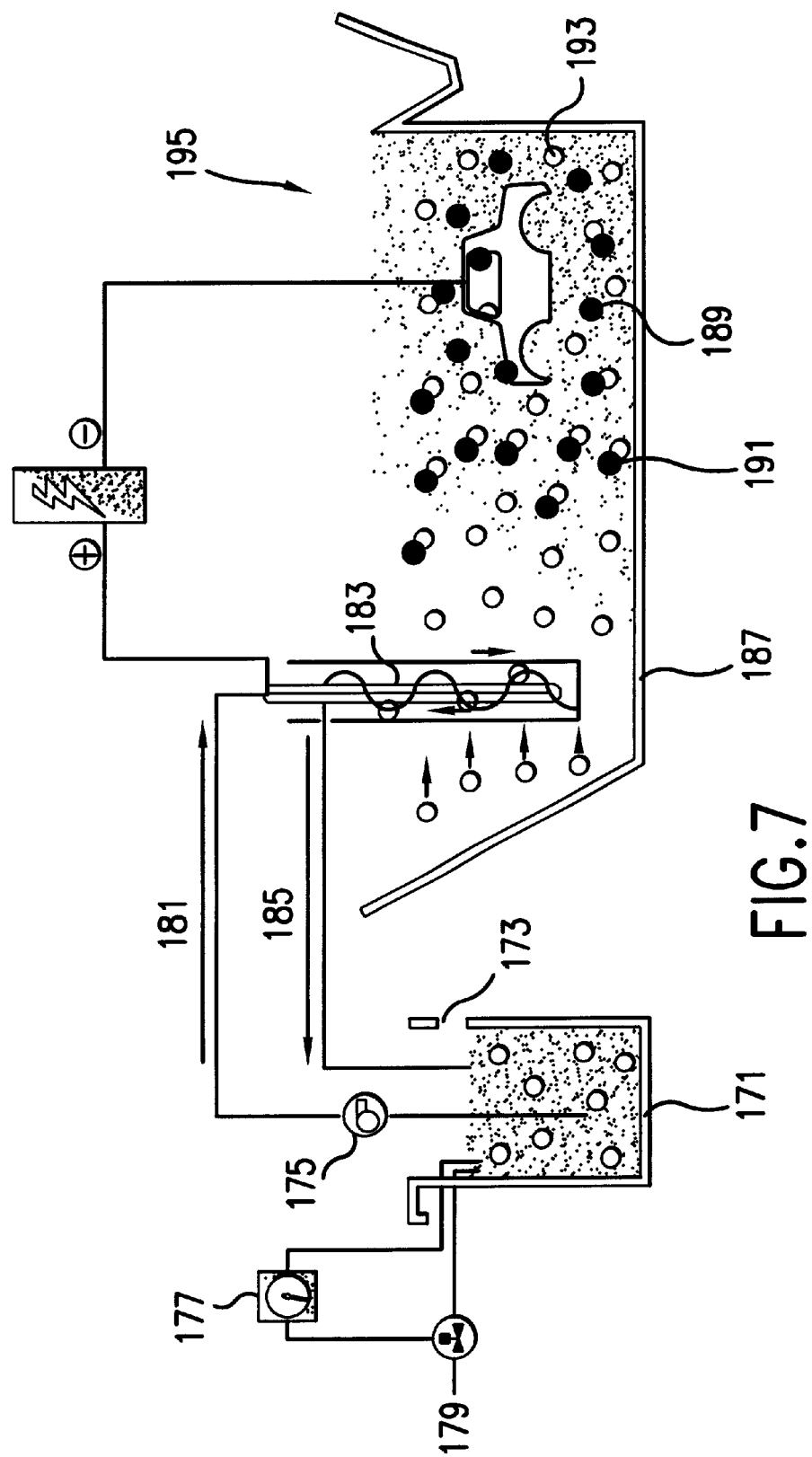
FIG. 7 shows a schematized typical use of the enhanced anocel™ type of membrane electrode device for electrodeposition coating according to a preferred embodiment of the present invention.

Referring now to FIG. 7, a generalized and schematized flow diagram shows a typical use of the anocel™ type of device with a convectional piping arrangement. Anolyte tank 171 includes an overflow to drain 173, a pump 175 and is used in conjunction with a conductivity meter 177. DI water source 179 (not shown) refreshes the anolyte solution in tank 171. The fresh anolyte solution 181 is pumped and flows in the direction of travel indicated by the arrow from anolyte tank 171 to the Referring now to FIG. 7, a generalized and schematized flow diagram shows a typical use of the anocel™ type of device 183, while spent anolyte solution 185 travels in the opposite direction, as indicated by the arrow. For example, according to the embodiment of the present invention which is depicted, paint tank 187 contains both painted product (represented by the darkened spheres) 189 and solubilized paint (represented by the joined darkened and light spheres) 191 in addition to the acid/solubilizer (shown as light spheres) 193. Thus cathode paint tank 195 permits the present invention to function as described above.

As discussed, such anolyte tank assemblies are available from Advanced Membrane Technology (San Diego, Calif. and Gainesville, Ga., and Beijing, China) and the same may be used in 70, 110 and 125 gallon capacities along with the device of the present invention. Anolyte Supply and Return manifolds, diode and shunt sensors, in addition to a meter panel, and flow indicators will all be within the normal skill of artisans for use with the present invention. The same are likewise available from PTI Advanced Filtration, Inc. (Oxnard, Calif. and Gainesville, Ga., and Beijing, China).

Accordingly, the improvement of the present invention, among other things, defines the flow of the solution. The design can accommodate Anolyte supply from any of the above delivery systems, hence increasing the performance of the cell.

Likewise, the present invention contemplates use of alternate anocel™ type cells, such as box shaped cells having multiple controlled orifices to distribute anolyte solution evenly across the bottom of a cell anode. Such designs extend cell life due to a controlled flow pattern that removes dirt and oxygen to eliminate low flow and no flow spots. With a box cell a large active area provides for more current draw capabilities up to 5 amps per square foot and 95 amps under load being recommended as a maximum for longest life. The one piece design eliminates flexing for a longer life, and flat edges are eliminated preventing the build up of paint solid.

Further contemplated as within the scope of the present invention is semi-circular cells using multiple controlled orifices to distribute anolyte solution evenly across the bottom of the cell anode. The relatively small size of this embodiment allows for easily placement of the same in a tank.

Having described preferred embodiments of the invention with reference to the accompanying drawings, it is to be understood that the invention is not limited to those precise embodiments, and that various changes and modifications may be effected therein by one of skill in the art without departing from the scope or spirit of the inventions as defined in the appended claims.

I claim:

1. A membrane electrode device for electrodeposition coating comprising:
    an electrode;
    a tubular membrane assembly;
    a bottom end cap;

a top end cap;
a means for supplying wash fluid into said bottom end cap; and
a means for supporting said top end cap,
said tubular membrane assembly comprising a selectively permeable membrane,
said electrode is surrounded along its axis by said tubular membrane assembly,
said bottom end cap comprising a means for engaging said tubular membrane assembly, said electrode, and a means for creating turbulence in said wash fluid introduced into said bottom end cap,
said top end cap comprising an outlet means for said wash fluid and a means for receiving said membrane assembly such that said electrode can pass through the center of said top end cap, through the center of said tubular membrane assembly, as received within said top end cap, and extend downwardly into the bottom end cap,
said means for supplying said wash fluid oriented so as to introduce said wash fluid into the bottom end cap,
said means for supporting said top end cap preventing said top end cap from deforming said tubular membrane assembly, and
when assembled, wash fluid introduced into the bottom end cap circulates through the means for creating turbulence and flows upward along the electrode and between said electrode and said membrane, to exit through said outlet for wash fluid.

2. The device according to claim 1, wherein said electrode has a central passage along its longitudinal axis, said central passage optionally sealed at the bottom.

3. The device according to claim 2, wherein the electrode further comprises a top end and a bottom end, wherein said top end is attached to an extender means of sufficient length to allow manipulation of the electrode by an operator, such that the operator need not contact the wash fluid in which the electrode is immersed.

4. The device according to claim 2, wherein the bottom end of said electrode is oriented such that the wash fluid can flow freely underneath said electrode.

5. The device according to claim 1, wherein said means for supporting said top end cap comprises a tubular water permeable form between said membrane and said electrode.

6. The device according to claim 5, wherein said water permeable form comprises a material of sufficient permeability such that wash fluid can circulate substantially freely through said form.

7. The device according to claim 5, wherein the material comprising said water permeable form is essentially flat.

8. The device according to claim 1, wherein said bottom end cap comprises:
a first cylinder with an inner surface and an outer surface, said surfaces defining a side wall; first and second ends, said first end being closed and said second end being open;
a grooved means between said inner and outer surfaces for receiving said tubular membrane assembly at said second end;
said inner surface defining an opening comprising at least a first and a second chamber, said first chamber being further defined by said first closed end, said second chamber having an inner diameter less than that of said first chamber, and of sufficient diameter to snugly receive said electrode;
the inner surface defining said second chamber further comprising a plurality of grooves such that said first chamber is in fluid communication with said tubular electrode along the length of said grooves.

9. The end cap according to claim 8, wherein said grooves are separated by no less than one groove width.

10. The device according to claim 1, wherein said means for supplying wash fluid is channeled axially through a side wall of said top cap, extends downwardly parallel to or within said electrode, and axially through the side wall of said bottom end cap, such that said wash fluid is not exposed to the interior surface of said electrode and is delivered into said bottom end cap.

11. The device according to claim 1, wherein said membrane is selectively permeable to ions and is pre-expanded.

12. The device according to claim 1, wherein said membrane is pre-expanded by soaking said membrane in a solution for at least about 10 minutes and then allowing said membrane to air dry.

13. The device according to claim 12, wherein said membrane is pre-conditioned by soaking said membrane in a solution for at least 10 minutes and then allowing said membrane to air dry.

14. A bottom end cap for a membrane electrode device wherein said end cap comprises:
a first cylinder with an inner surface and an outer surface, said surfaces defining a side wall; first and second ends, said first end being closed and said second end being open;
a grooved means between said inner and outer surfaces for receiving a tubular membrane assembly at said second end;
said inner surface defining an opening comprising at least a first and a second chamber, said first chamber being further defined by said first closed end, said second chamber having an inner diameter less than that of said first chamber, and of sufficient diameter to snugly receive an electrode;
the inner surface defining said second chamber further comprising a plurality of grooves such that said first chamber is in fluid communication with said electrode along the length of said grooves.

15. A membrane for a membrane electrode device, wherein said membrane is selectively permeable to ions and has been subjected to pre-expansion.

16. A membrane according to claim 15, wherein said membrane will not undergo significant swelling when used in an electrodeposition application.

17. A membrane according to claim 15, wherein said pre-expansion comprises soaking said membrane in a solution for at least about 10 minutes and then allowing said membrane to air dry.

18. A membrane according to claim 17, wherein said solution comprises about 30–50 percent by weight of glycerin, ethylene glycol, or an aqueous solution of polyhydroxy compounds.

19. A method for pre-expansion of a membrane for a membrane electrode device, said method comprising:
placing the membrane in a solution that will prevent significant swelling of the membrane when used in an electrodeposition application; and soaking the membrane in the solution for at least about 10 minutes.

20. A method according to claim 19, wherein said pre-expansion comprises soaking said membrane in about 30–50% by weight glycerin, ethylene glycol, or an aqueous solution of polyhydroxy compounds.

21. A top end cap for a membrane electrode device, said top end cap comprising: an outlet means for a circulating wash fluid and a means for receiving a tubular membrane assembly such that an electrode can pass through the center of said top end cap, and through the center of said tubular membrane assembly.

22. An electrodeposition coating device comprising:

an electrode having an axis;

a membrane assembly surrounding said electrode along said axis and having an inner surface, an outer surface, and a selectively permeable membrane between said inner surface and said outer surface; and a bottom end cap through which wash fluid is introduced into said membrane assembly such that said wash fluid flows turbulently between said electrode and said inner surface of said membrane assembly.

23. An electrodeposition coating device according to claim 22, wherein said bottom end cap has angled rifling.

24. An electrodeposition coating device according to claim 22, including a circulating system that supplies fresh wash fluid to said membrane assembly through said bottom end cap and removes used wash fluid from said membrane assembly.

25. An electrodeposition coating device comprising:

an electrode having an axis; and a membrane assembly surrounding said electrode along said axis and having an inner surface, an outer surface, and a selectively permeable membrane between said inner surface and said outer surface, said membrane being pre-expanded.

26. An electrodeposition coating device according to claim 25, including a bottom end cap through which wash fluid is introduced into said membrane assembly such that said wash fluid flows turbulently between said electrode and said inner surface of said membrane assembly.

27. An electrodeposition coating device according to claim 25, including a circulating system that supplies fresh wash fluid to said membrane assembly and removes used wash fluid from said membrane assembly.

28. An electrodeposition coating device comprising:

an electrode having an axis;

a membrane assembly surrounding said electrode along said axis and having an inner surface, an outer surface, and a selectively permeable membrane between said inner surface and said outer surface;

a bottom end cap attached to said membrane assembly; and a top end cap attached to said membrane assembly.

29. An electrodeposition coating device according to claim 28, including a circulating system that supplies fresh wash fluid to said membrane assembly through said bottom end cap and removes used wash fluid from said membrane assembly from said top end cap.

30. An electrodeposition coating system comprising:

an first electrode having an axis;

a membrane assembly surrounding said first electrode along said axis and having an inner surface, an outer surface, and a selectively permeable membrane between said inner surface and said outer surface;

a bottom end cap through which wash fluid is introduced into said membrane assembly such that said wash fluid flows turbulently between said first electrode and said inner surface of said membrane assembly;

a battery having a first terminal electrically connected to said first electrode and a second terminal; and a product electrically connected to said second terminal.

31. An electrodeposition coating system comprising:

an electrode having an axis;

a membrane assembly surrounding said electrode along said axis and having an inner surface, an outer surface, and a selectively permeable membrane between said inner surface and said outer surface;

a battery having a first terminal electrically connected to said first electrode and a second terminal; and a product electrically connected to said second terminal, said membrane being pre-expanded.

32. An electrodeposition coating system comprising:

an electrode having an axis;

a membrane assembly surrounding said electrode along said axis and having an inner surface, an outer surface, and a selectively permeable membrane between said inner surface and said outer surface;

a bottom end cap attached to said membrane assembly;

a top end cap attached to said membrane assembly;

a battery having a first terminal electrically connected to said first electrode and a second terminal; and a product electrically connected to said second terminal.

* * * * *